(12) United States Patent
Tsuda (10) Patent No.: US 6,935,457 B2
(45) Date of Patent: Aug. 30, 2005

(54) BODY FRAME OF A RIDING TRACTOR

(76) Inventor: Toshio Tsuda, 2-18-1, Inadera, Amagasaki-shi, Hyogo (JP)

( * ) Notice: Subject to any disclaimer, the term of this patent is extended or adjusted under 35 U.S.C. 154(b) by 201 days.

(21) Appl. No.: 10/347,294

(22) Filed: Jan. 21, 2003

(65) Prior Publication Data

US 2003/0136602 A1 Jul. 24, 2003

(30) Foreign Application Priority Data

Jan. 21, 2002 (JP) .................................... 2002-011218

(51) Int. Cl.[7] .............................................. B62D 21/00
(52) U.S. Cl. ..................................................... 180/312
(58) Field of Search ............................... 180/311, 312, 180/89.1, 89.12; 280/299, 300, 781, 785, 797, 800

(56) References Cited

U.S. PATENT DOCUMENTS 4,267,895 A * 5/1981 Eggert, Jr. ................. 180/68.1

6,758,301 B2 * 7/2004 Shiba et al. ................ 180/383

FOREIGN PATENT DOCUMENTS

JP 63-173770 7/1988

* cited by examiner

Primary Examiner—Faye M. Fleming
(74) Attorney, Agent, or Firm—Sterne, Kessler, Goldstein & Fox P.L.L.C.

(57) ABSTRACT

A body frame is provided for a riding tractor. An axis of an engine mounted on the body frame is oriented lengthwise along the tractor and a flywheel is provided on the axis of the engine. The body frame comprises a pair of left and right side members extending lengthwise along the tractor, cross members disposed in front and rear of the engine, respectively, so as to connect the left and right side members to each other, and reinforcing members provided on inside portions of the respective side members. The reinforcing members are disposed laterally inward from the lateral outermost end of the flywheel in a space between the engine and each of the side members.

7 Claims, 9 Drawing Sheets

BODY FRAME OF A RIDING TRACTOR

FIELD OF THE INVENTION

The present invention relates to a frame construction of a riding tractor.

BACKGROUND ART

The typical layout of a conventional riding tractor includes an engine supported by a body frame in the front portion of a tractor and a transmission supported by the body frame behind the engine. A seat is disposed on the upper surface of the transmission, and power from the engine is transmitted to the transmission so as to drive rear and front wheels.

This construction is useful because a power train including the engine and the transmission is compactly settled therein. Therefore, this construction is widely adopted as the layout of an ordinary riding tractor.

Also included in the typical layout at a conventional riding tractor is a stay for mounting the engine onto the body frame provided on the engine. The stay is projected outward from a side of the engine and connected to the body frame under the stay through a rubber cushion or similar structure.

The typical body frame of a conventional riding tractor comprises left and right side members that extend lengthwise along the tractor and are connected to each other through lateral cross members. The engine, especially a lower portion thereof, is disposed between the left and right side frames. Each of the left and right side members has upper and lower horizontal flats connected to each other through a vertical side portion of the side member so as to be sectionally formed in a substantially C-like shape which faces its open side to the lateral center of the tractor.

As is well-known in the art, reinforcing members are attached to the respective side members to improve the rigidity of the body frame. Such a construction is disclosed in the Japanese Patent Laid Open Gazette Sho. 63-173770, for example. The lateral gap between the reinforcing members provided on the left and right side members is longer than the lateral width of the engine so as to allow the lower portion of the engine, generally an oil pan, to be inserted between the side members, thereby lowering the center of gravity of the engine and stabilizing the tractor.

However, the above-mentioned conventional body frame is complicated in that the side members are disposed on the left and right outsides of the engine while being prevented from interfering with a front axle casing provided below the engine.

Additionally, each of the side members, positioned lengthwise along the tractor so as to secure the vertical rigidity thereof, is provided at the upper portion thereof with an engine mounting member for connecting the engine through the rubber cushion to the body frame. However, a large area of the engine mounting member must be provided at the laterally narrow upper flat of the side member for maintaining contact with the engine. Moreover, equipping the reinforcing members on the body frame is difficult because the reinforcing members must be provided on the inside of the respective C-like shaped side members while a sufficient space for the lower portion of the engine must be secured between the right and left side members in consideration of vibration of the engine.

Hence, as the body frame must be designed so as to fulfill various requirements as mentioned above, the structure becomes complicated, which increases production costs and the body weight of the tractor.

Moreover, the portion of the side member where the reinforcing member is attached is made of double-stratified steel plates. If the double-stratified portion of the side member is bent in a C-like shape, the upper flat, while being stratified, becomes so heavy as to reduce the rigidity of the vertical side plate portion of the side member.

In addition, this construction of the body frame is wide so as not to be suitable for a small tractor.

DISCLOSURE OF THE INVENTION

An object of the present invention is to provide a body frame of a riding tractor for mounting an engine thereon, an axis of the engine being oriented lengthwise along the tractor. A flywheel is provided on the axis of the engine, comprising a pair of left and right side members extended lengthwise along the tractor, cross members disposed in front and rear of the engine, respectively, so as to connect the left and right side members to each other, and a reinforcing member provided on an inside portion of each of the left and right side members. The body frame can be laterally narrowed and lightened while ensuring the rigidity thereof, thereby being applicable to a small tractor.

According to the present invention, each of the reinforcing members is disposed laterally inward from the laterally outermost end of the flywheel in a space between the engine and each of the left and right side members. Thus, the dead space between the engine and the side member is effectively utilized for arranging each of the reinforcing members even if the side members closely approach the engine so as to narrow the body frame for increasing the rigidity thereof. Consequently, the lateral width of the body frame can be reduced so as to be applicable to a small tractor having a laterally narrow body while the reinforcing members are prevented from interfering with the engine.

Preferably, each of the reinforcing members is disposed at a height between the vertical middle and lower end of the flywheel in the space between the engine and each of the side members.

Preferably, a stay, on which a vibration proof member for anti-vibratory support of the engine is mounted, is provided on a side surface of each of the left and right side frames so as to extend laterally outward from each of the side members. Therefore, the reaction force of the engine is efficiently supported, and an influence of vibration of the engine onto the body frame is reduced, thereby realizing a weight saving in the body frame.

An axle casing may be suspended from one of the cross members. However, the lower portion of the engine between the side members can be disposed so as to lower the weight of the tractor body while the body frame is prevented from interfering with the axle casing.

These, other, and further objects, features, and advantages will appear more fully from the following description.

PREFERRED EMBODIMENT OF THE INVENTION

Figure 1:
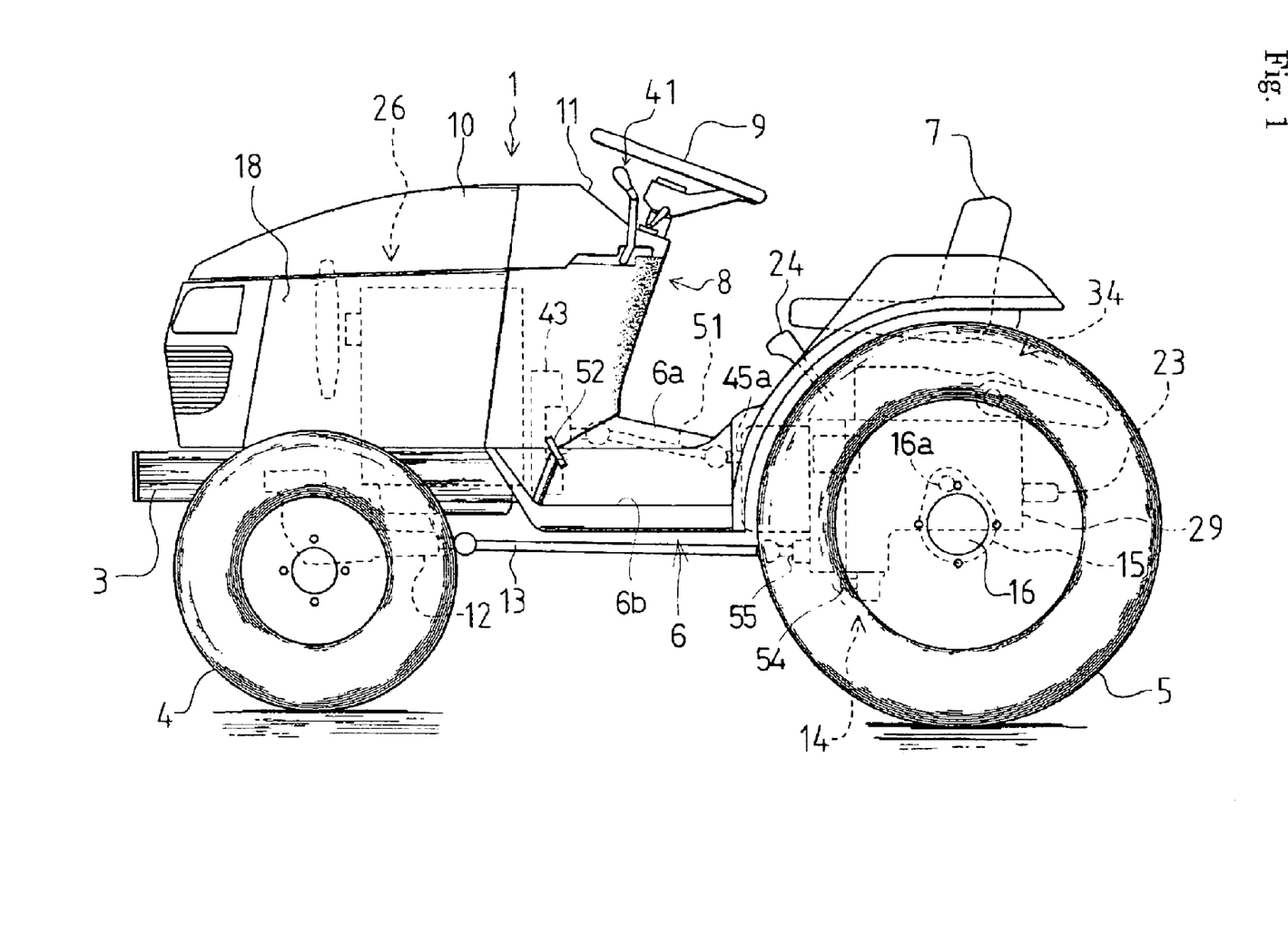
FIG. 1 is a side view of an agricultural tractor according to the present invention.

Referring to FIG. 1, description will be given of an agricultural tractor 1 according to an embodiment of the present invention. The agricultural tractor 1 has a body frame 3, whose rear end is attached to a front surface of a transmission casing 29 of a transmission 14. On left and right side surfaces of a rear portion of transmission casing 29 are disposed respective rear axle casings 15.

An engine 26 is mounted on body frame 3, and covered with a bonnet 10, left and right side covers 18, and any additional covers as desired. A dashboard 8 is vertically mounted on the longitudinally intermediate portion of body frame 3 and connected to the rear end of side covers 18. On the top surface of dashboard 8 is disposed an instrument panel 11 and a steering wheel 9 for changing the lateral turning direction of a pair of front wheels 4.

A floor cover member 6 made of synthetic resin is provided above body frame 3 so as to constitute an operation part. Floor cover member 6 is molded so as to include a vertically convex portion 6a for covering a later-discussed propeller shaft 51, and left and right step portions 6b serving as left and right edges of the convex portion 6a. The rear portion of floor cover member 6 rises above transmission 14 so as to have an operator's seat 7 mounted thereon.

Body frame 3 supports at the forward lower portion thereof a front axle casing 12, which suspends left and right front wheels 4 on the left and right ends thereof. Left and right rear axle casings 15 support respective rear axles 16, and left and right rear wheels 5 are attached to outer ends of left and right rear axles 16, respectively. Left and right differential output shafts 16a project from left and right side surfaces of transmission casing 29 and are connected to the rear axles 16 in the rear axle casings 15, respectively.

A neutral pedal 52 is disposed above the left step portion 6b. By depressing neutral pedal 52, transmission 14 is set in neutral so as to stop tractor 1. A brake such as a disk brake may be used so as to brake rear axles 16 and the front axles simultaneously when neutral pedal 52 is depressed.

A rear-loading working machine can be connected to the rear portion of tractor 1, and a rear PTO shaft 23 for driving the working machine projects from the rear surface of transmission casing 29. A hydraulic lift device 34 having lift arms for raising and lowering the working machine is provided on the upper rear surface of transmission casing 29. Moreover, transmission 14 is provided at the bottom thereof with a mid PTO shaft 54 projecting forward so as to drive a front-loading working machine.

A reversing lever 41, for changing the traveling direction of tractor 1 between forward and backward, i.e., for changing the rotational direction of rear wheels 15, projects laterally sideward from either the left or right side surfaces (in this embodiment, the left side) of dashboard 8. Lever 41 is supported so as to rotate in the longitudinal direction of tractor 1 while a knob of a speed change lever 24 is turned in a substantially lateral direction of tractor 1. Reversing lever 41 is linked with a controlling mechanism of transmission 14 through a linkage mechanism.

A transmission mechanism and a differential mechanism for driving left and right differential output shafts 16a are disposed in transmission 14. A speed change lever 24 is disposed beside seat 7 so as to change the rotary speed of rear axles 16 through the transmission mechanism and the differential mechanism, thereby changing the traveling speed of tractor 1. Moreover, a PTO clutch mechanism for cutting and connecting the power to rear PTO shaft 23 and mid PTO shaft 54 is disposed within transmission 14 so as to either interrupt or transmit the power from and to the front-loading working machine.

In this construction, the driving force of engine 26 is inputted into transmission 14 through propeller shaft 51 while a front end of propeller shaft 51 is connected to engine 26 through a damper mechanism attached to a later-discussed flywheel 43. A rear end of propeller shaft 51 is connected to a hydraulic stepless transmission mechanism 45 (hereinafter, "HST", shown in FIG. 2) provided in a front portion of transmission 14.

The driving force transmitted to transmission 14 drives rear wheels 5 via left and right rear axles 16.

A front wheel driving power take off shaft 55 is supported in the front portion of transmission 14 so as to rotate synchronously with differential output shafts 16a. The rotary power of front wheel driving power take off shaft 55 is transmitted to front axle casing 12 through a propeller shaft 13 and universal joints so as to drive left and right front wheels 4.

Moreover, the power of engine 26 is also transmitted to rear PTO shaft 23 and mid PTO shaft 54 supported by transmission 14.

Figure 2:
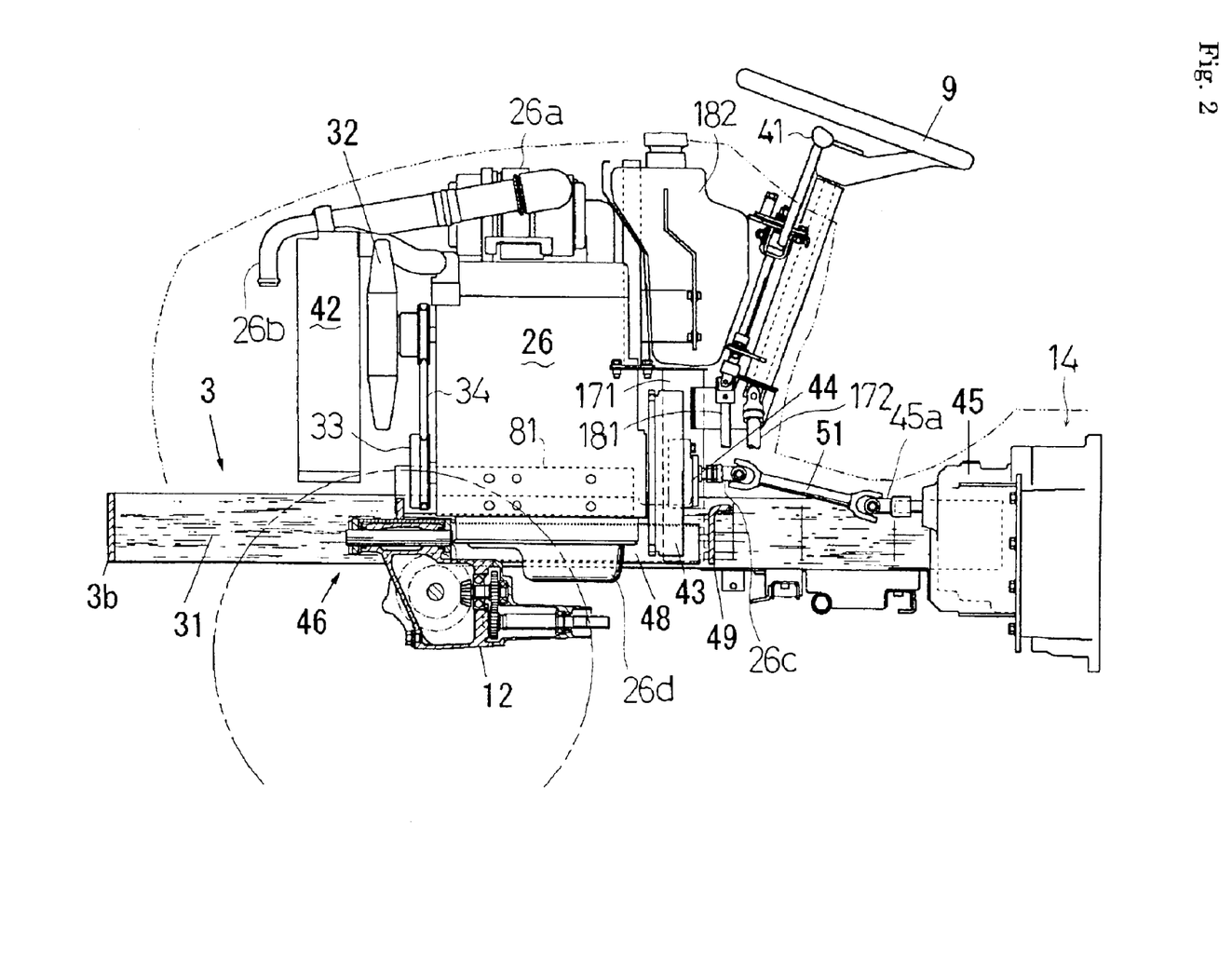
FIG. 2 is an inner side view partly in section of a principal portion of a tractor according to the present invention, including a body fame supporting an engine thereon.
Figure 3:
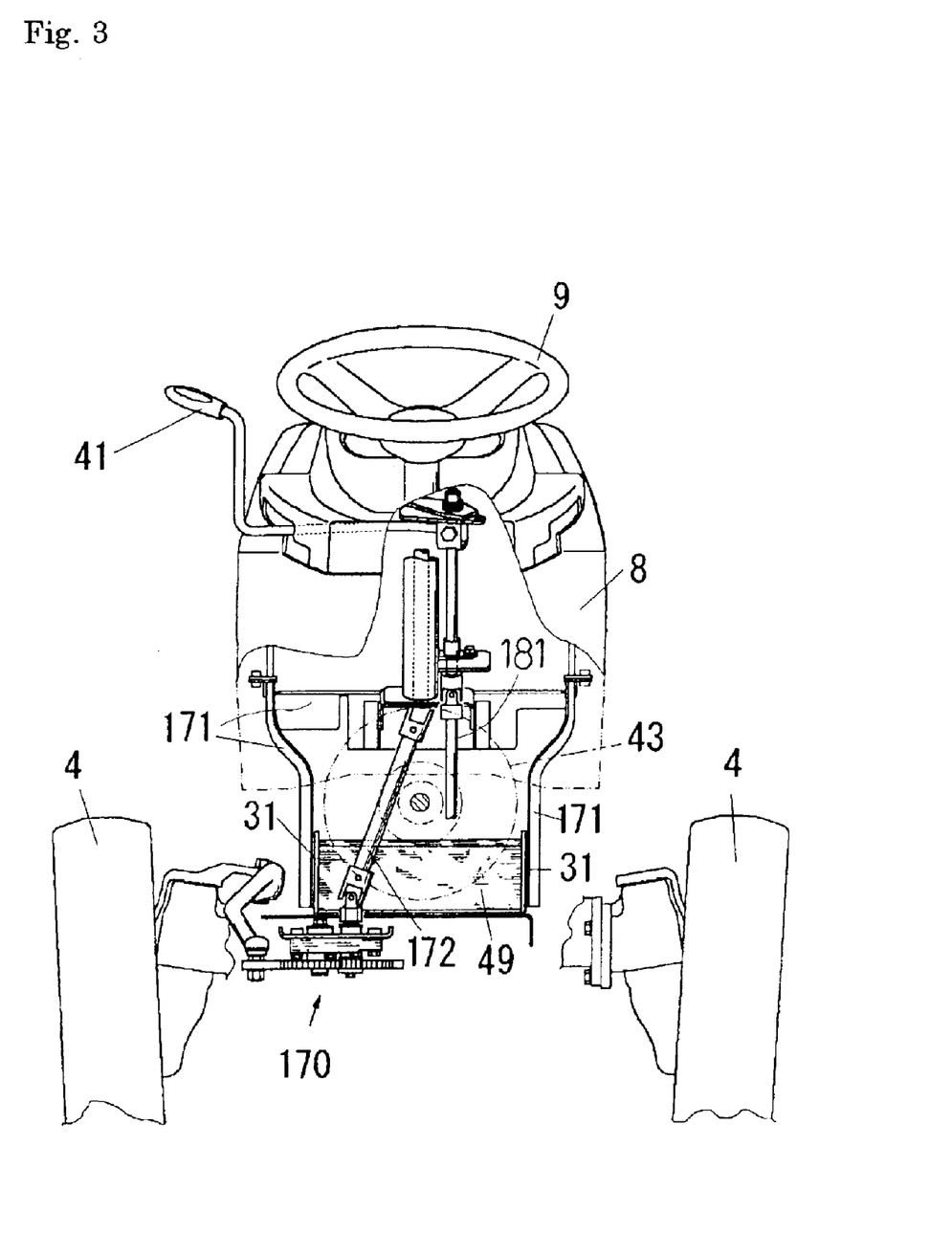
FIG. 3 is a rear view partly in section of a principal portion of a tractor according to the present invention.

Referring now to FIGS. 2 and 3, engine 26 is disposed so as to orient the axis of a crankshaft lengthwise along tractor 1. A fan 32 is provided on a front surface of engine 26, and a radiator 42 is provided in front of fan 32. An air cleaner 26a is provided on the upper portion of engine 26, and an air intake port 26b is disposed in front of radiator 42 so as to be connected to air cleaner 26a. A front end of the engine crankshaft projects forward from the front surface of engine 26 below fan 32 and is provided thereon with a pulley 33 for driving fan 32 via a fan belt 34.

A flywheel 43 is provided on the rear axial end of the crankshaft of engine 26. An engine output shaft 26c, serving as the rear end of the engine crankshaft, is axially supported in flywheel 43 through a damper 44. Engine output shaft 26c projects backward from flywheel 43 and is pivotally connected to a front end of propeller shaft 51. The rear end of propeller shaft 51 is connected to an input shaft 45a of HST 45 in the front portion of transmission 14. Engine 26 is connected at the lower portion thereof to body frame 3 through vibration proof members.

Body frame 3 will be described with reference to FIGS. 2 to 10. As shown in FIGS. 2 to 5, body frame 3 comprises left and right side members 31. Each of side members 31 is made of a platy member, which is vertically flat. Left and right side members 31 extend substantially lengthwise along tractor 1, parallel to each other; however, portions of side members 31 adjacent to the rear ends thereof (behind a later-discussed rear cross member 49) are bent toward each other so as to narrow the space therebetween, as best shown in FIG. 5. The portion of body frame 3 defining the narrower space is disposed together with propeller shaft 51 in convex portion 6a of floor cover member 6.

Side members 31 are connected to each other through front, middle, and rear cross members 3b, 46, and 49. Front cross member 3b is provided in the front end portion of body frame 3 so as to connect the front ends of side members 31 to each other. Middle cross member 46 is disposed close to the front portion of engine 26. Rear cross member 49 is substantially formed in a vertically reversed L-like shape, seen best in FIG. 6, and is disposed behind flywheel 43.

Body frame 3 is fixedly provided with four stays 72. A pair of front and rear stays 72 are fixed to an outside surface of each of side members 31. Vibration proof members 71, such as rubber cushions, are mounted onto respective stays 72. Engine 26 is elastically supported by stays 72 through vibration proof members 71. The vibratory isolating support of engine 26 will be detailed later.

A pair of reinforcing members 48 are fixed onto lower inside portions of respective side members 31 and extended lengthwise along tractor 1 on left and right sides of the lower portion of engine 26 so as to enhance the rigidity of the portion of body frame 3 where engine 26 is mounted.

Reinforcing members 48 are provided between middle and rear cross members 46 and 49. Consequently, the lower portion of engine 26, generally serving as an oil pan 26d of engine 26, is disposed between left and right side members 31 and surrounded on all sides by middle and rear cross members 46 and 49 and reinforcing members 48, thereby being supported firmly against vibration.

Reinforcing member 48 may be fixed to side member 31 by any conventional means, such as welding, etc. The thickness and the shape of reinforcing member 48 can be determined independent of side member 31. Therefore, tractor 1 may be manufactured efficiently by coordinating the shape and the thickness of reinforcing member 48 with the shape of the provided engine 26 and the required rigidity.

As shown in FIGS. 2 and 3, behind rear cross member 49 are disposed a steering control shaft 172, which extends downward from the steering wheel 9, and a reversing control shaft 181, which extends downward from reversing lever 41. Steering control shaft 172 and reversing control shaft 181 are prevented from interfering with propeller shaft 51 and engine output shaft 26c.

Steering control shaft 172 is pivotally connected at the lower end thereof to steering control mechanism 170, which is disposed below body frame 3 so as to turn front wheels 4 leftward and rightward through a drag rod according to operation of steering wheel 9. Reversing control shaft 181 is operatively connected to the transmission mechanism (such as HST 45) in transmission casing 29.

As shown in FIGS. 2 and 3, steering wheel 9 and steering control shaft 172 are supported together with reversing lever 41 and reversing control shaft 181 by a rear portion of a stay 171. Stay 171 is fixed at left and right foot portions thereof to outer surfaces of respective side members 31 and mounted vertically across left and right side members 31 just in front of rear cross member 49 so as to surround flywheel 43. An upper portion of stay 171 supports a fuel tank 182 just behind the upper portion of engine 26.

Steering wheel 9 and reversing lever 41 are disposed adjacent to engine 26. However, these operation members 9 and 41 are supported through stay 171 by body frame 3, which is sufficiently reinforced as mentioned above so as to be shielded from the engine vibration. In other words, operation members 9 and 41 are isolated from the engine vibration so as to prevent deformation caused by engine vibration and improve the comfort and operability of tractor 1.

Due to the vibration proofing effect of body frame 3, and since reinforcing members 48 and rear cross member 49 are provided nearer to seat 7 than middle cross member 46, the comfort and workability of riding tractor 1 is improved for an operator sitting on seat 7.

Figure 6:
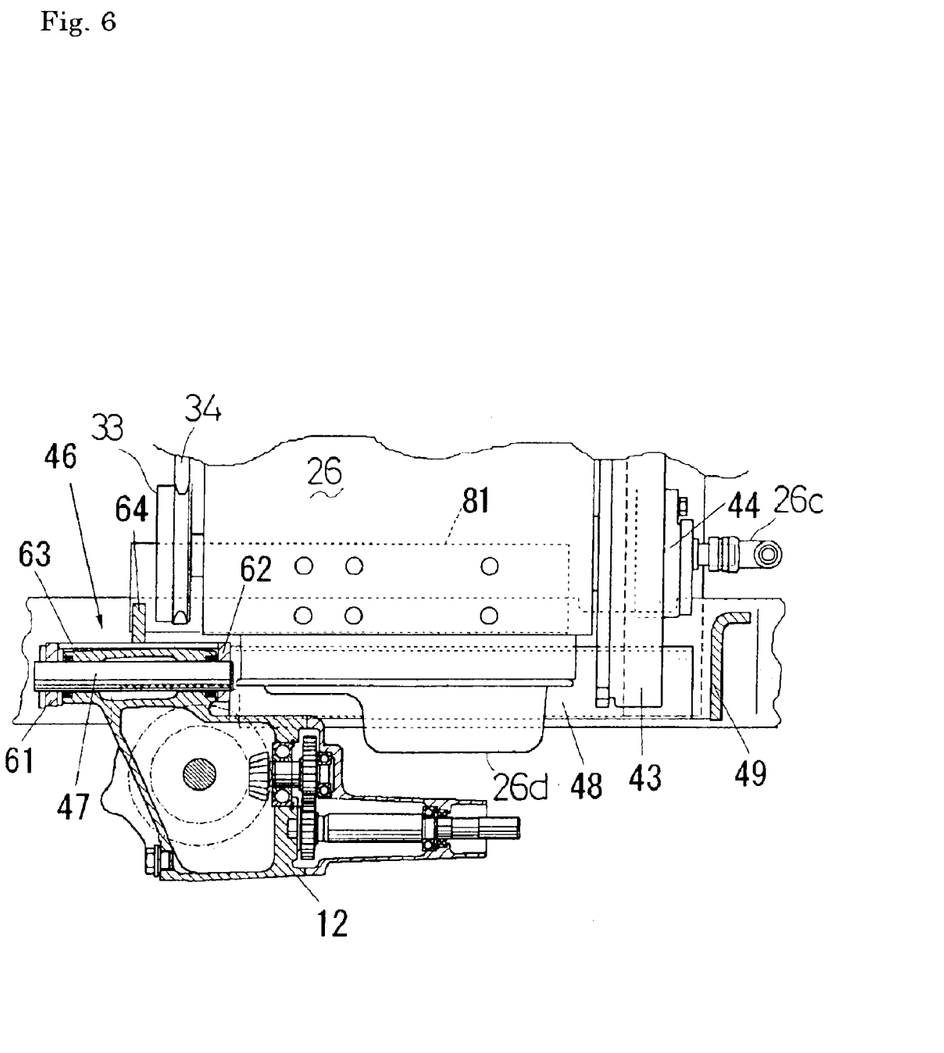
FIG. 6 is a fragmentary side view partly in section of the body frame of the present invention supporting the engine.

As shown in FIGS. 2 and 6, middle cross member 46 vertically rotatably supports front axle casing 12. Middle cross member 46 comprises plates 61, 62, 63, and 64, which are extended laterally between side members 31 and joined together. An upper end of vertical front plate 61 is joined to a front end of horizontal plate 63, and an upper end of vertical rear plate 62 is joined to a rear end of horizontal plate 63. Vertical plate 64 is mounted upright on the longitudinally middle upper surface of horizontal plate 63. A pivot shaft 47 for pivoting front axle casing 12 is disposed lengthwise along tractor 1 just below horizontal plate 63. Pivot shaft 47 is supported at a front end thereof by front plate 61 and at a rear end thereof by rear plate 62.

As shown in FIG. 6, vertical rear plate 62 and horizontal plate 63 are disposed so as to fit a shape of a cantilevering lower front portion of engine 26 disposed between left and right side members 31, and vertical plate 64 is disposed just in front of pulley 33 so as to guard pulley 33. Thus, cross member 46 protects the lower front portion of engine 26.

Figure 4:
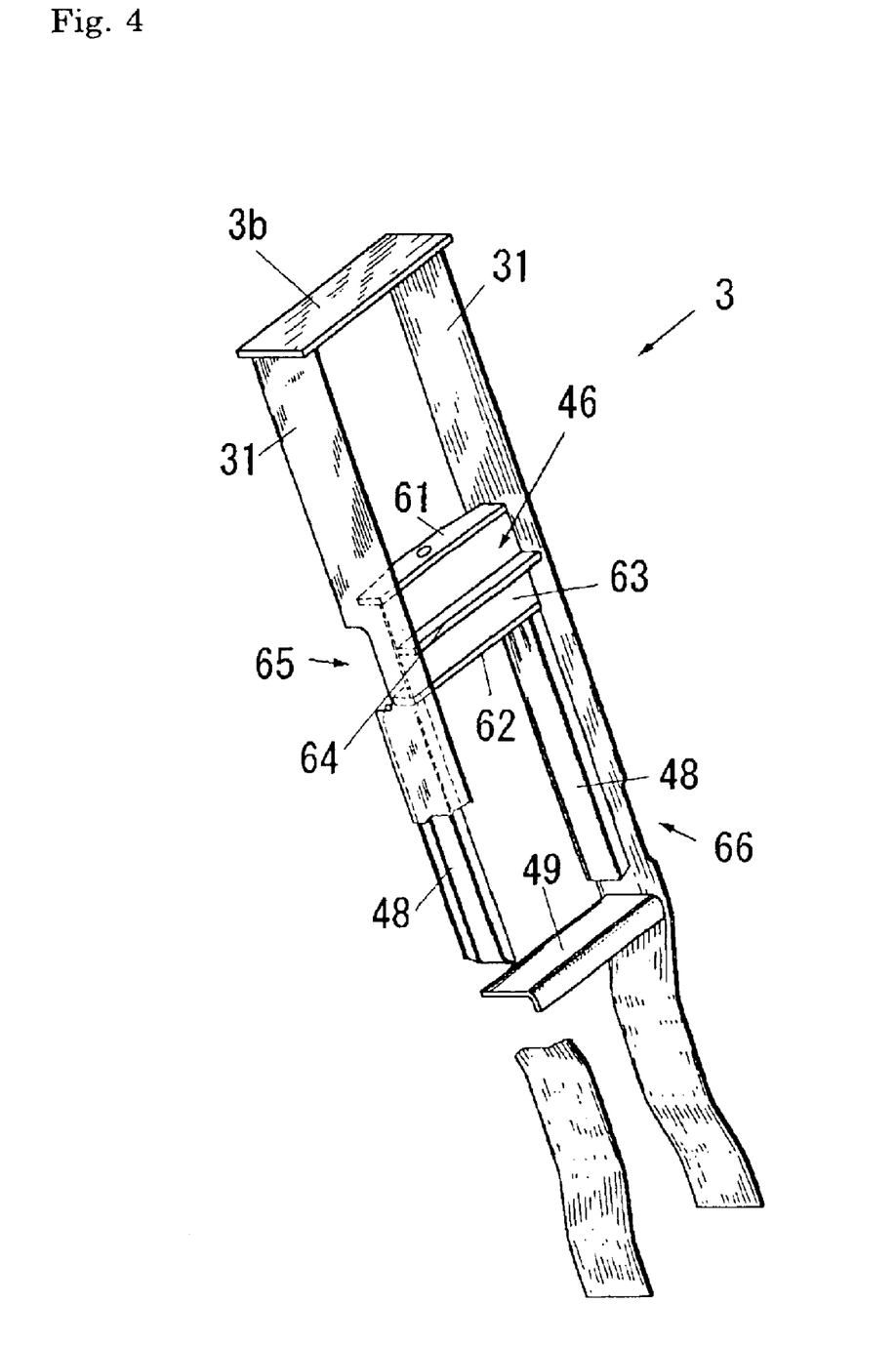
FIG. 4 is a perspective and partly broken view showing the reinforcement construction of the body frame of the present invention.
Figure 5:
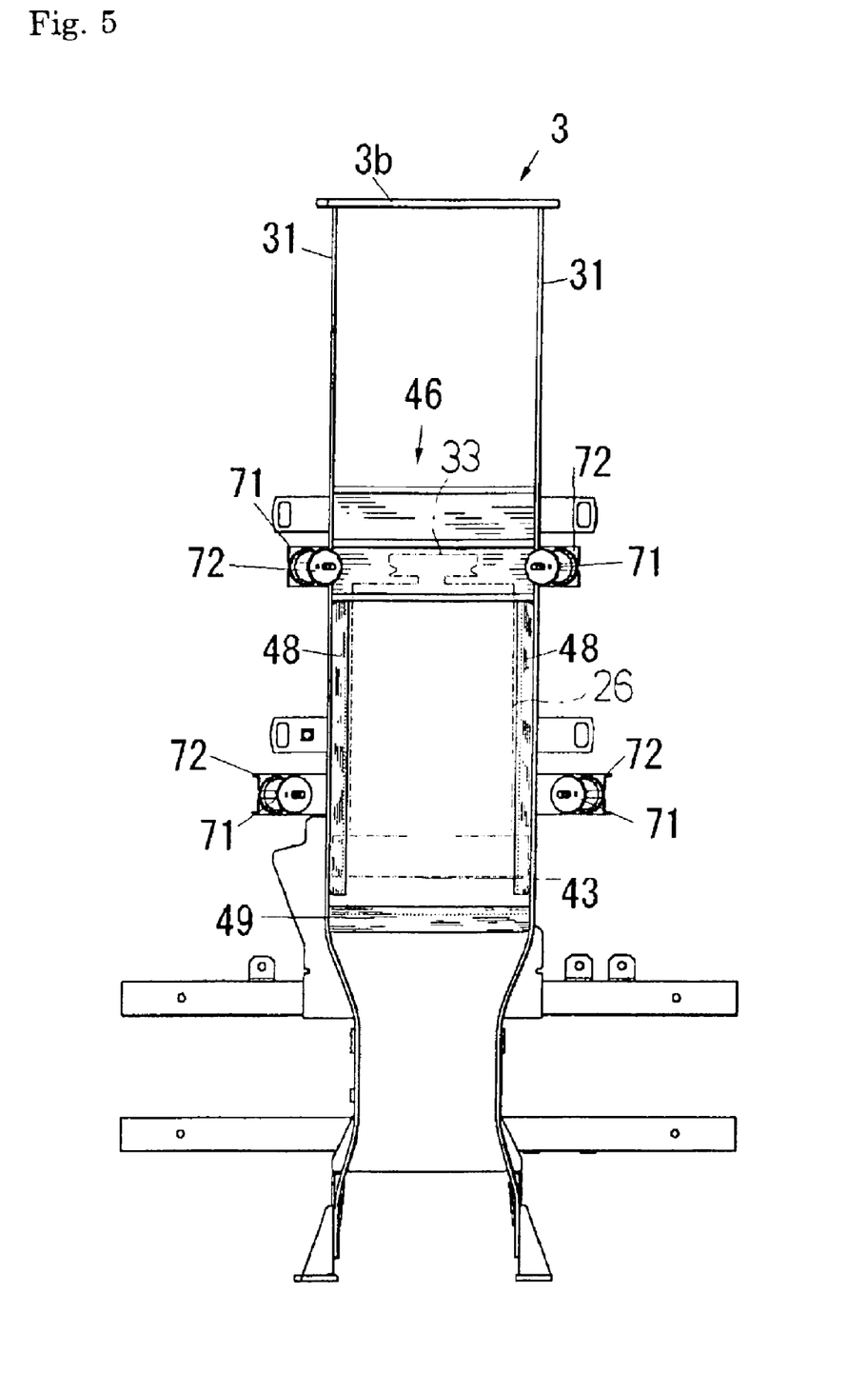
FIG. 5 is a plan view of the body frame of the present invention.

As shown in FIG. 4, side members 31 are provided at the bottoms thereof with respective downward open notches 65, which are substantially shaped so as to fit cross member 46, thereby being prevented from interfering with front axle casing 12.

Figure 7:
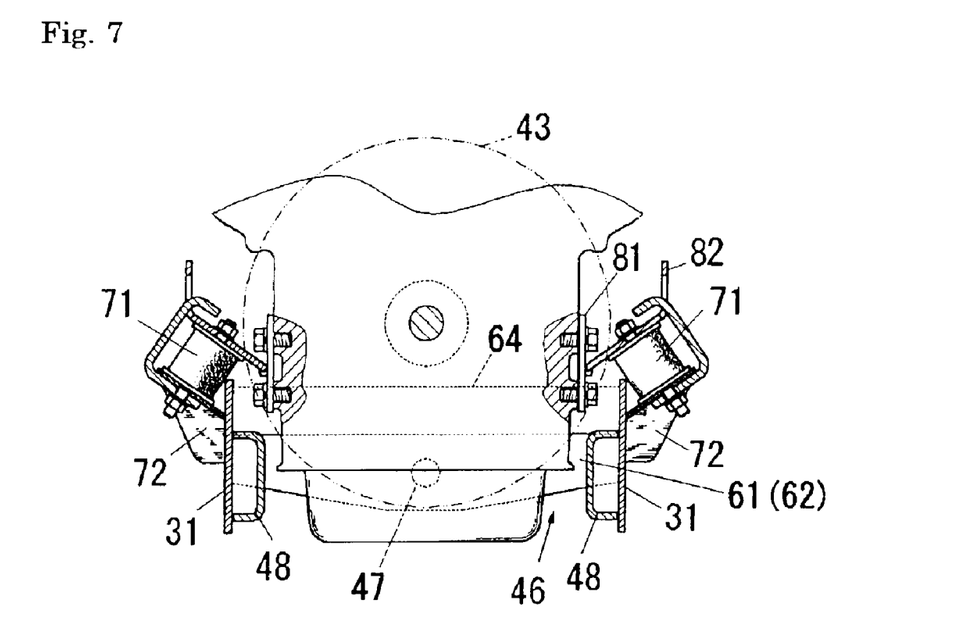
FIG. 7 is a fragmentary rear view partly in section of the body frame of the present invention.
Figure 8:
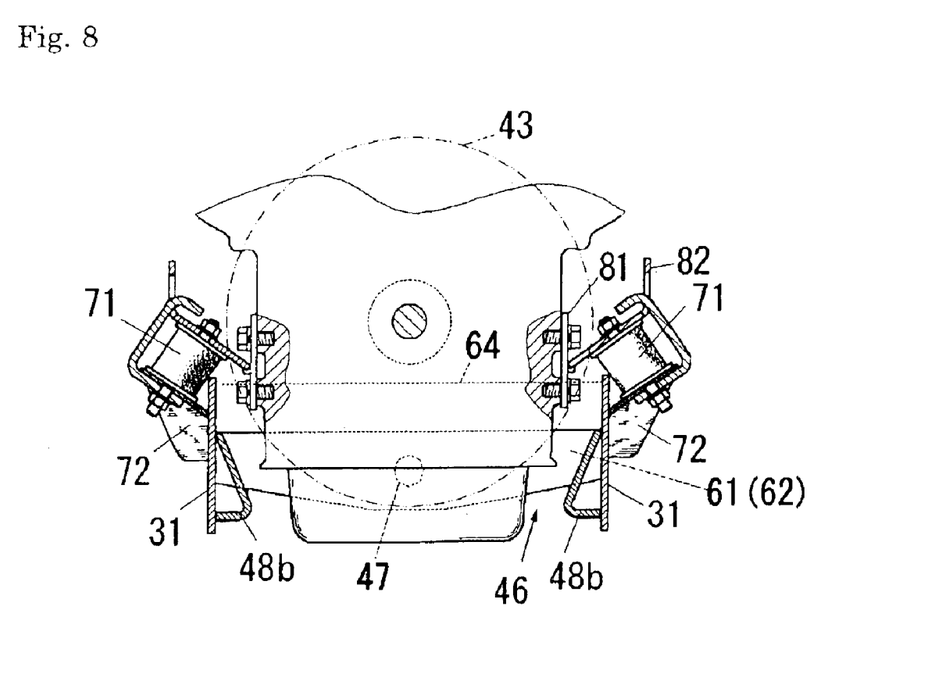
FIG. 8 is a fragmentary rear view partly in section of the body frame of the present invention having alternate reinforcing frames.

In addition, as shown in FIGS. 7 and 8, each of front and rear vertical plates 61 and 62 is inclined at the bottom thereof upward from the lateral middle to each of the left and right ends so as to be prevented from interfering with vertically rotating front axle casing 12.

As shown in FIGS. 4 and 5, the distance between left and right side members 31 is almost equal to the lateral width of flywheel 43. Upwardly open notches 66 are formed in the upper portions of respective side members 31 in order to avoid interference with flywheel 43. Therefore, the width of body frame 3 is reduced so as to increase the rigidity thereof in the longitudinal direction of tractor 1 while engine 26, whose lower portion is disposed between side members 31, is disposed at a low position.

Either cross member 46 or reinforcing member 48 is fixed to the inside surface of the portion of each side member 31 whose outside surface is fixed to each stay 72 supporting engine 26 through vibration proof member 71. This arrangement reinforces all stays 72 so as to reduce the influence of the vibration from engine 26 on body frame 3 and reduce the vibration of the body of tractor 1.

The vibratory isolating support arrangement of engine 26 with stays 72 and the vibration proof members 71 will be detailed in accordance with FIGS. 5, 7, and 8. Front and rear stays 72 project laterally upwardly outward from the outside surface of each of left and right side members 31. Engine 26 is provided with left and right platy vibration proof support members 81, extend lengthwise along tractor 1 and attach to respective lower edges of left and right side surfaces of a crankcase of engine 26. A pair of front and rear arms 82 fixedly project laterally upwardly outward parallel to respective stays 72 from each of vibration proof support members 81 so that each vibration proof member 71 is disposed between corresponding arm 82 and stay 72. The terminal portion of each of arms 82, which extends laterally outward from vibration proof member 71, is bent upward.

Vibration proof members 71 may be made of rubber, synthetic resin, or other elastic material. Vibration proof members 71 may include metal springs. Vibration proof members 71 are required to support engine 26 against the weight of engine 26 and torque reaction force generated by engine 26 even if tractor 1 is severely jostled due to travel on a bad road. Preferably, vibration proof members 71 also dampen noise and vibration of engine 26.

The arrangement of reinforcing members 48 will be described with reference to FIGS. 7 and 8. In the space between engine 26 and each of side members 31, reinforcing members 48 project inward from the inner side surface of side members 31 toward engine 26 so as to secure an effective sectional area thereof for reinforcing side member 31.

Figure 9:
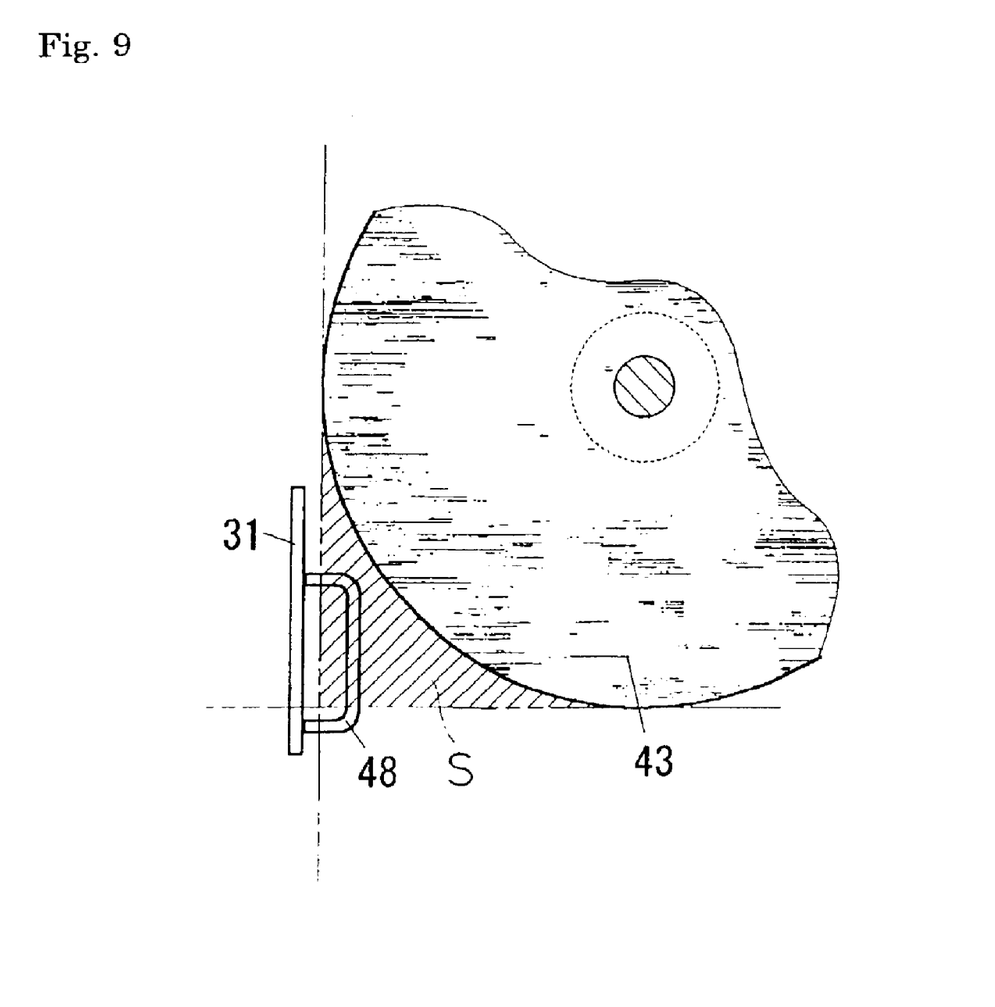
FIG. 9 is a schematic front view showing the positional relation between the reinforcing frame and an engine flywheel.

As shown in FIGS. 7 and 9, when viewed in front or rear (lengthwise along tractor 1), the inward side portion of reinforcing member 48 is positioned laterally inward from the lateral outermost end of flywheel 43 in a space S between flywheel 43 and side member 31. Space S is filled with hatching in FIG. 9.

Also, when viewed in front or rear (lengthwise along tractor 1), the upper end portion of reinforcing member 48 is positioned at a height between the vertical middle and lower end of flywheel 43 in space S between flywheel 43 and side member 31.

Thus, the dead space between engine 26 and each of side members 31 is effectively utilized for arranging each of reinforcing members 48 extremely close to engine 26 while side members 31 approach engine 26 so as to narrow body frame 3 and increase the rigidity thereof.

Each of reinforcing members 48 is sectionally formed in a C-like shape, as shown in FIG. 7. According to another embodiment shown in FIG. 8, a sectionally laterally projecting V-like shaped reinforcing member 48b may replace each of the C-like reinforcing members 48. Reinforcing member 48b has a horizontal bottom surface and a slant surface facing engine 26 so that reinforcing member 48b may be stronger and disposed nearer to engine 26 than reinforcing member 48.

Vertically flat side members 31 simplify body frame 3 and ensure sufficient space on the vertical surface thereof for fixture of reinforcing members 48 (or 48b) and stays 72. More specifically, side members 31 can be disposed adjacent to engine 26 (especially, flywheel 43) because they are vertically flat. However, as may be necessary, either an upper end or a lower end of side member 31 may be bent horizontally. In this case, the upper and lower end portions of side member 31 can be bent easily because reinforcing member 48 is not attached to these portions.

Figure 10:
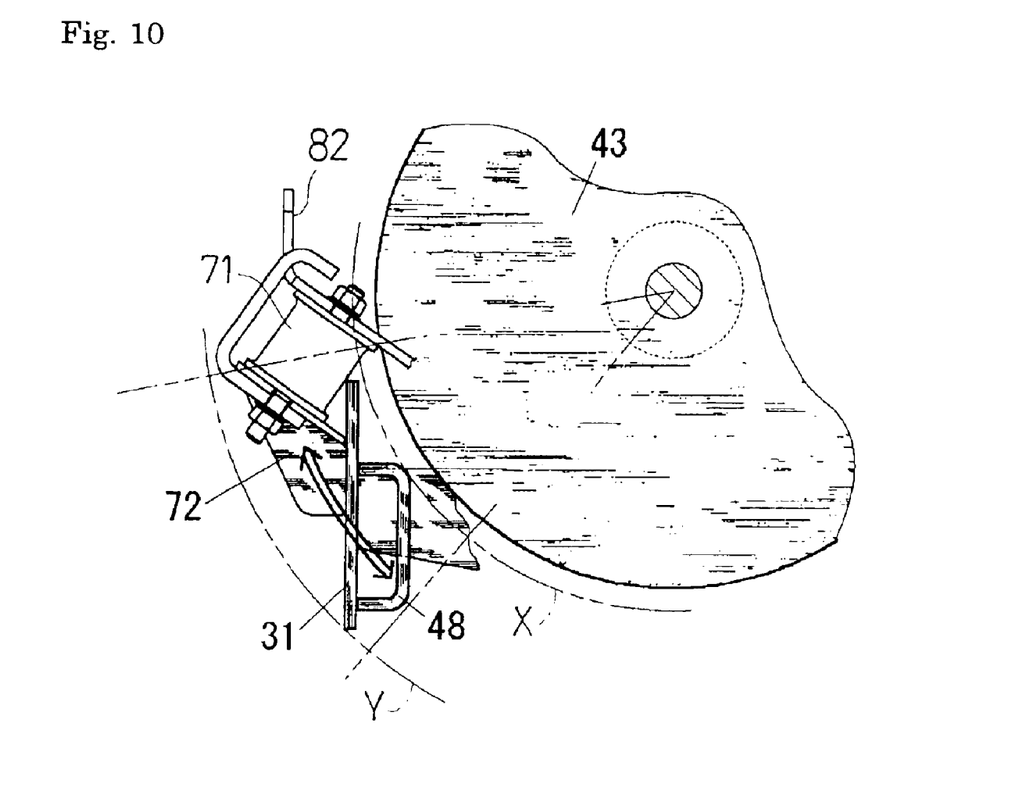
FIG. 10 is a schematic front view showing the positional relation among a stay, a reinforcing frame, and a flywheel.

The positional relation of stay 72 and reinforcing member 48 to side member 31 will be described with reference to FIG. 10. Stay 72 and reinforcing member 48 are positioned in a region surrounded by two-dot chain lines in FIG. 10. Specifically, when viewed from the rear, stay 72 and reinforcing member 48 are positioned in the region between small and large arcs X and Y centered on the crankshaft serving as the center of flywheel 43. Small arc X passes a portion of side member 31 nearest to the crankshaft, and large arc Y passes a portion of side member 31 farthest from the crankshaft.

In this way, stay 72, side member 31, and reinforcing member 48 are distributed in the arcuate region centering on the crankshaft so that the reaction force of engine 26, caused by the driving force thereof along the arc, is distributed among stay 72, side member 31 and reinforcing member 48, thereby reducing the stress on body frame 3. As a result, body frame 3 which supports engine 26 and front axle casing 12 is narrowed and lightened. The lower portion of engine 26 is disposed between left and right side members 31 of body frame 3 and the rigidity of body frame 3 is maintained. Such a narrow and light body frame 3 is useful for a small tractor or contributes to a wider pitch of running wheels 4 or 5 disposed on left and right sides of body frame 3. Due to this construction, body frame 3 is narrowed, which is useful for a riding tractor, and suitable for a construction wherein the width of the body is shortened and a weight saving in body frame 3 is realized.

What is claimed is:

1. A body frame of a riding tractor for mounting an engine thereon, an axis of the engine being oriented lengthwise along the tractor, and a flywheel being provided on the axis of the engine, comprising:

a pair of left and right side members extending lengthwise along the tractor;

at least one cross member disposed between the left and right side members so as to connect the left and right side members to each other; and a pair of left and right reinforcing members provided on inside portions of the left and right side members, respectively, wherein each of the reinforcing members is disposed laterally inward from the lateral outermost end of the flywheel in a space between the engine and each of the side members.

2. A body frame of a riding tractor according to claim 1 wherein each of the reinforcing members is disposed at a height between a vertical middle and a vertical bottom of the flywheel.

3. A body frame of a riding tractor according to claim 1 wherein a stay, on which a vibration proof member for anti-vibratory support of the engine is mounted, is provided on a side surface of each of the left and right side members so as to extend laterally outward from each of the side members.

4. A body frame of a riding tractor according to claim 1 wherein an axle casing is suspended from one of the cross members.

5. A body frame of a riding tractor according to claim 1 wherein said at least one cross member comprises a pair of cross members.

6. A body frame of a riding tractor according to claim 5, wherein said pair of cross members comprises front and rear cross members disposed in front and rear of the engine, respectively.

7. A body frame of a riding tractor according to claim 1 wherein a pair of front and rear stays, on which a vibration proof member for anti-vibratory support of the engine is mounted, is provided on a side surface of each of the left and right side members so as to extend laterally outward from each of the side members, and wherein each of the left and right reinforcing members is provided on the inside portion of each of the side members between the front and rear stays.

* * * * *